United States Patent
Stemmer et al.

(10) Patent No.: US 7,455,361 B2
(45) Date of Patent: Nov. 25, 2008

(54) FITTING FOR A VEHICLE SEAT

(75) Inventors: Jürgen Stemmer, Remscheid (DE); Rainer Messerschmidt, Düsseldorf (DE); Tobias Ewald, Essen (DE); Grit Scholz, Remscheid (DE); Andreas Norbisrath, Wuppertal (DE); Artur Komainda, Remscheid (DE); Holger Finner, Hückeswagen (DE); Ulrich Lehmann, Alfter (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 12/004,550

(22) Filed: Dec. 21, 2007

(65) Prior Publication Data

US 2008/0136241 A1    Jun. 12, 2008

Related U.S. Application Data

(63) Continuation of application No. PCT/EP2006/005254, filed on Jun. 2, 2006.

(30) Foreign Application Priority Data

Jun. 22, 2005   (DE) ...................... 10 2005 028 779

(51) Int. Cl.
    *B60N 2/22*    (2006.01)
(52) U.S. Cl. ....................... 297/362; 475/162
(58) Field of Classification Search ................ 297/362; 475/162, 175–178
    See application file for complete search history.

(56) References Cited

U.S. PATENT DOCUMENTS

| 4,614,257 | A | 9/1986 | Harada et al. |
| 5,277,672 | A * | 1/1994 | Droulon et al. ............. 475/176 |
| 5,308,294 | A * | 5/1994 | Wittig et al. ................ 475/162 |
| 5,634,689 | A | 6/1997 | Putsch et al. |

(Continued)

FOREIGN PATENT DOCUMENTS

| DE | 31 29 672 C1 | 10/1982 |
| DE | 44 36 101 A1 | 6/1995 |
| DE | 197 29 562 A1 | 1/1998 |
| DE | 20 2004 009 594 U1 | 9/2004 |
| DE | 103 52 630 A1 | 6/2005 |
| EP | 1 013 500 A2 | 6/2000 |

OTHER PUBLICATIONS

U.S. Appl. No. 12/004,700, filed Dec. 21, 2007; In re: Jürgen Stemmer et al., entitled Fitting for a Vehicle Seat.

*Primary Examiner*—Peter R. Brown
(74) *Attorney, Agent, or Firm*—Womble Carlyle Sandridge & Rice, PLLC

(57) ABSTRACT

A fitting (10) for a vehicle seat, more particularly for a motor vehicle seat, comprises a first fitting part (11), a second fitting part (12) that is in geared connection with the first fitting part (11), a driver (21) and wedge segments (27a, 27b), which at least partly define a cam that is rotatably mounted on the first fitting part (11) for driving a rolling movement of the first fitting part (11) and the second fitting part (12) against one another, and with a first sliding bearing (28) or rolling bearing, by way of which the wedge segments (27a, 27b) are mounted on the second fitting part (12) with a small amount of friction, at least a first (27a) of the two wedge segments (27a, 27b) being mounted on the first fitting part (11) with a small amount of friction by way of a second sliding bearing (41) or rolling bearing.

20 Claims, 3 Drawing Sheets

U.S. PATENT DOCUMENTS

| | | | |
|---|---|---|---|
| 6,305,748 B1 * | 10/2001 | Ohba | 297/362 |
| 6,619,743 B1 * | 9/2003 | Scholz et al. | 297/362 |
| 6,918,635 B2 * | 7/2005 | Finner et al. | 297/362 |
| 7,090,298 B2 * | 8/2006 | Lange | 297/362 |
| 2004/0014545 A1 | 1/2004 | Branov et al. | |
| 2004/0258101 A1 | 12/2004 | Lange | |
| 2005/0099049 A1 | 5/2005 | Spevy et al. | |
| 2005/0110322 A1 * | 5/2005 | Cha | 297/362 |

* cited by examiner

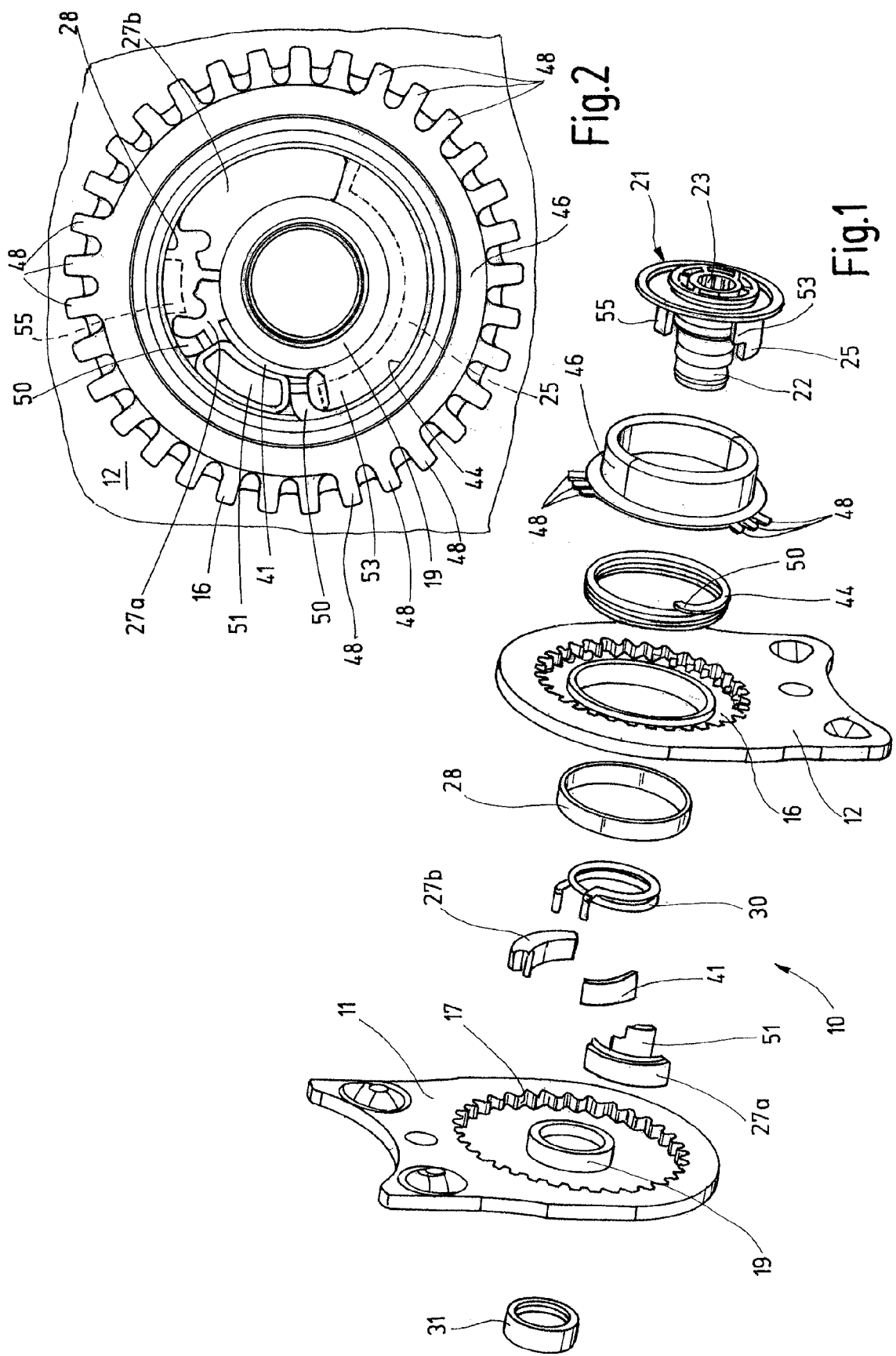

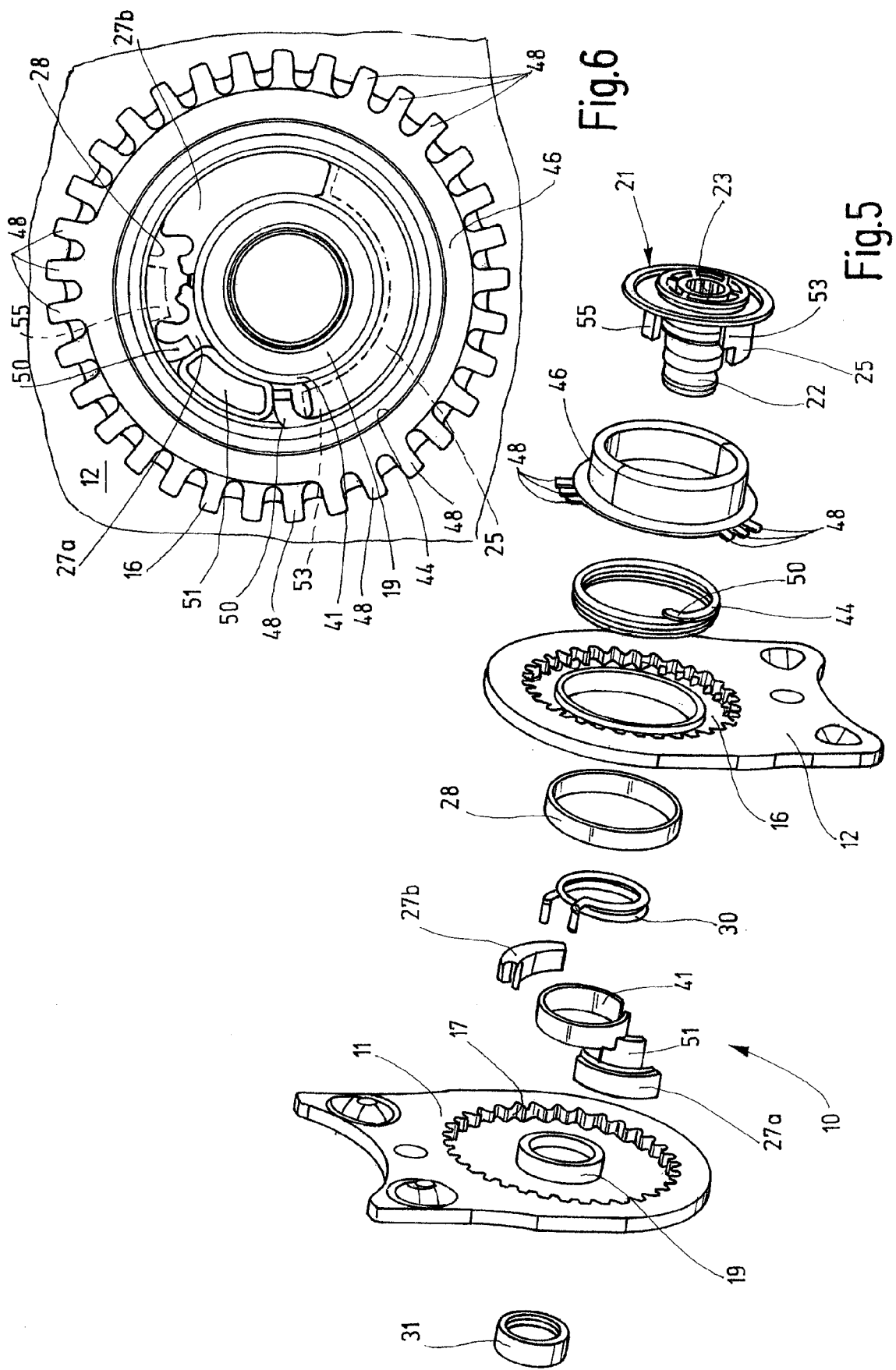

FITTING FOR A VEHICLE SEAT

CROSS-REFERENCE TO RELATED APPLICATION

The present application is a continuation of International Application PCT/EP2006/005254, which was filed Jun. 2, 2006. The entire disclosure of International Application PCT/EP2006/005254, which was filed Jun. 2, 2006, is incorporated herein by reference.

TECHNICAL FIELD

The present invention relates to a fitting for a vehicle seat, in particular for a motor vehicle seat, with the fitting having a first fitting part; a second fitting part in geared connection with the first fitting part; a driver and wedge segments, which at least partially define an eccentric that is rotatably mounted on the first fitting part and is for driving a rolling movement of first fitting part and the second fitting part on each other; and a first sliding bearing or rolling bearing, by way of which the wedge segments are mounted with little friction on the second fitting part.

BACKGROUND

In the case of a fitting of the above-described type known from DE 44 36 101 A1, the wedge segments sit directly on a collar extension of the first fitting part. The static friction on account of the material pairing of steel on steel contributes to preventing running-down of (e.g., undesired pivoting of) the fitting. When the fitting is driven, the wedge segments move with the lower sliding friction around the collar extension.

SUMMARY OF SOME ASPECTS OF THE INVENTION

The present invention is based on the object of improving a fitting of the type described in the above Technical Field section of this disclosure. This object is achieved according to the present invention by a fitting for a vehicle seat, in particular for a motor vehicle seat, with the fitting comprising: a first fitting part and a second fitting part, wherein there is geared connection between the first fitting part and the second fitting part so that there can be relative rolling between the first fitting part and the second fitting part; wedge segments that at least partially define an eccentric for being driven, wherein the wedge segments are rotatably mounted on both the first fitting part and the second fitting part, whereby the eccentric is rotatably mounted on both the first fitting part and the second fitting part; a driver for driving the eccentric so that the eccentric causes the relative rolling between the first fitting part and the second fitting part; a first bearing for reducing friction, wherein the wedge segments are rotatably mounted with little friction on the second fitting part by way of the first bearing, and the first bearing is a sliding bearing or a rolling bearing; and a second bearing for reducing friction, wherein at least a first of the wedge segments is rotatably mounted with little friction on the first fitting part by way of the second bearing, and the second bearing is a sliding bearing or a rolling bearing.

Because of the fact that at least a first of the two wedge segments is mounted with little friction on the first fitting part by way of a second sliding bearing or rolling bearing, i.e. is mounted on both sides by way of sliding bearings or rolling bearings, with the friction between the sliding bearing (or rolling bearing) and the component sliding relative thereto being lower than the direct friction between the wedge segments and the fitting parts, the losses during the driving of the fitting, i.e. during the adjusting movement, are reduced, thus increasing the efficiency of the fitting. For the same output power, a lower driving power is therefore required. The freedom from play and the strength are maintained. The lower friction of the sliding bearing in comparison to conventional steel is based on a special surface processing and/or treatment. The lower friction of the rolling bearing in comparison to the sliding friction of conventional steel is based on the rolling friction of the rolling bodies. The sliding bearings or rolling bearings may also be provided in a mixed combination. The wedge segments within the meaning of the invention can also be formed in each case on a disk, with the two (eccentric) disks then being arranged in an axially offset manner with respect to each other.

Since the backrest is loaded more to the rear than to the front, one of the wedge segments is subjected to a higher load, and therefore a higher degree of friction basically occurs thereon. The wedge segment which is subjected to a higher load is preferably therefore the wedge segment which is mounted on both sides by way of sliding bearings. However, the other wedge segment or—likewise preferably—both wedge segments can also be mounted on both sides by way of sliding bearings.

The fitting according to the invention can be operated both manually and by motor, and can be used in vehicle seats, preferably in order to adjust the inclination of the backrest or the inclination of the seat cushion or a thigh support or the seat height. The driver may be in a single part or in a number of parts.

Since a wedge segment which is mounted on both sides by way of sliding bearings is no longer self-locking, and also the fitting would therefore possibly be no longer self-locking, a brake for the wedge segment is provided at least on one side of the vehicle seat, with the brake holding the wedge segment in the inoperative state of the fitting and being released during the driving of the rolling movement. A fitting of this type is safe with regard to running-down as well as favorable with regard to efficiency. A brake of this type does not need to be provided in the fitting on the other side of the vehicle seat.

A preferred brake is a wrap spring brake which supplies a high locking moment on the output side, but, when a torque is introduced on the drive side, rotates with a freewheeling moment which is low in relation to the locking moment. Instead of a wrap spring brake, a clamping roller freewheel may also be provided. The wrap spring brake produces its locking moment preferably by bearing against a wrap spring bushing which is rotationally fixed with respect to the second fitting part, preferably by way of a positive fit between suitable projections, for example radially protruding arms, of the wrap spring bushing and an inner toothing (present because of the production process) of the second fitting part. The wrap spring brake is preferably arranged within the wrap spring bushing such that it bears against the inner wall of the wrap spring bushing and its customarily present wrap spring arms protrude radially inward. The wrap spring arms are preferably arranged in such a manner that: when a cam of one or both wedge segments bears against a wrap spring arm, the wrap spring brake is acted upon in a closing manner; and when one or two cams of the driver, which is rotating during the driving operation, bears against a wrap spring arm, the wrap spring brake is acted upon in an opening manner.

BRIEF DESCRIPTION OF THE DRAWINGS

The invention is explained in more detail below with reference to two exemplary embodiments illustrated in the drawings.

FIG. 1 shows an exploded illustration of the first exemplary embodiment.

FIG. 2 shows a partial view of the first exemplary embodiment with the driver only partially shown.

FIG. 5 shows an exploded illustration of the second exemplary embodiment.

FIG. 6 shows a partial view of the second exemplary embodiment without a driver.

DETAILED DESCRIPTION OF EXEMPLARY EMBODIMENTS

Figure 3:
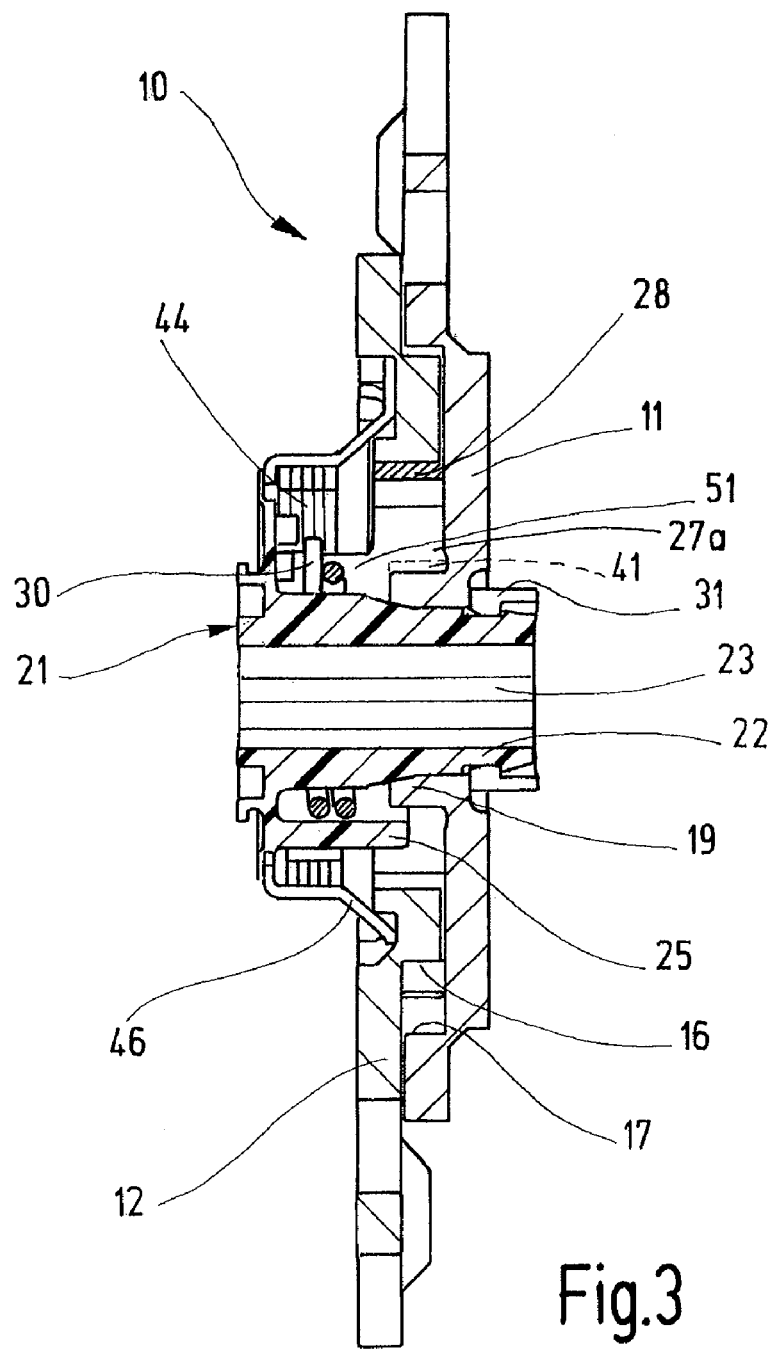
FIG. 3 shows a longitudinal section of a fitting according to the invention.
Figure 4:
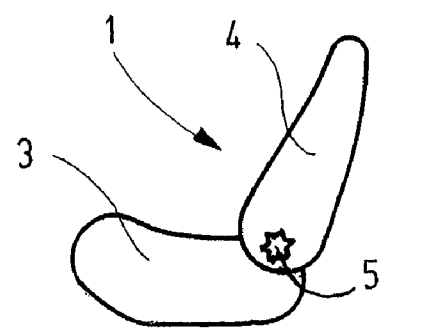
FIG. 4 shows a schematic illustration of a vehicle seat.

A vehicle seat 1 for a motor vehicle has a seat part 3 and a backrest 4. The backrest 4 can be adjusted in its inclination relative to the seat part 3. A hand wheel 5 can be actuated manually in order to adjust the inclination. The hand wheel 5 is located on one side of the vehicle seat 1 and rotates a drive shaft (not shown). The drive shaft is arranged horizontally in the transition region between seat part 3 and backrest 4 and, on both sides of the vehicle seat 1, engages in a rotationally fixed manner in a respective fitting 10. The backrest 4 is connected to the seat part 3 by way of the two fittings 10.

The fitting 10 is designed as a geared fitting, in which a first fitting part 11 and a second fitting part 12 are connected to each other for adjustment and fixing via a gear designed as an eccentric epicyclic gear which is self-locking at least in the case of one of the two fittings 10 of the vehicle seat 1. The two fitting parts 11 and 12 have an essentially (e.g., substantially) flat shape and are composed of steel. The first fitting part 11 is fixedly connected to the structure supporting the hand wheel 5 and the drive shaft (in the present case, the first fitting part 11 is fixedly connected to the structure of the backrest 4). Therefore, in the exemplary embodiment, the first fitting part 11 is illustrated in a manner for being fixed on the backrest (e.g., the first fitting part 11 is shown extending above the second fitting part 12 in the drawings). Accordingly, in the exemplary embodiment, the second fitting part 12 is fixed on the seat part, i.e. the second fitting part 12 is connected to the structure of the seat part 3, and the second fitting part 12 is shown extending below the first fitting part 11 in the drawings. The positions of the fitting parts 11 and 12 may be interchanged, depending on requirements.

In order to form the gear, a toothed wheel 16 with an outer toothing is embossed on the second fitting part 12, a toothed ring 17 with an inner toothing is embossed on the first fitting part 11, and teeth of the toothed wheel 16 and the toothed ring 17 mesh with each other. The diameter of the outside circle of the outer toothing of the toothed wheel 16 is smaller by at least one tooth height than the diameter of the root circle of the inner toothing of the toothed ring 17. The corresponding difference in the number of teeth of toothed wheel 16 and toothed ring 17 permits a rolling movement of the toothed ring 17 on the toothed wheel 16.

The first fitting part 11 has, on its side which faces the toothed wheel 16, an integrally formed collar extension 19. The collar extension 19 is concentric with respect to the inner toothing of the toothed ring 17. A driver 21 is mounted with play by way of a hub 22 in the collar extension 19. The driver 21, which is composed of plastic and the arrangement of which defines the direction details used in this disclosure, is provided centrally with a bore 23 which matches the external splines of the drive shaft and runs axially. Furthermore, the driver 21 has an integrally formed driver segment 25 which is arranged in a sickle-shaped manner about (e.g., around) part of the collar extension 19. Two wedge segments 27a and 27b are supported, at least indirectly by way of their curved inner sides, on the collar extension 19. The wedge segments 27a and 27b, by way of their curved outer sides, support a first sliding bearing 28. The first sliding bearing 28 is pressed into the second fitting part 12 in a rotationally fixed manner. The friction between the outer side of the metallic wedge segments 27a and 27b and the inner side of the bushing-shaped, first sliding bearing 28 is significantly lower than the direct friction between the wedge segments 27a and 27b and the fitting parts 11 or 12 would be.

The driver segment 25 engages with play between the narrow ends of the wedge segments 27a and 27b. The mutually facing wide ends of the wedge segments 27a and 27b each support an angled end finger of an annularly coiled spring. This annularly coiled spring is referred to below as omega spring 30. The omega spring 30 pushes the wedge segments 27a and 27b apart in the circumferential direction and therefore configures the fitting 10 in a manner free from play in the inoperative state. The driver 21 is secured axially on the outer side of the first fitting part 11 by way of a securing ring 31 which is clipped on. In order to absorb the axially acting forces, holding plates (not shown in the drawings) are respectively welded (in a manner known per se) onto the two fitting parts 11 and 12 and respectively engage over the other fitting part in each case without obstructing the adjustment movement.

The driver segment 25 and the wedge segments 27a and 27b define an eccentric which, as an extension of the direction of eccentricity, presses the toothed wheel 16 and the toothed ring 17 into each other at an engagement point defined by the eccentricity. During driving by way of the rotating drive shaft, a torque is first transmitted to the driver 21 and then to the eccentric (e.g., the wedge segments 27a, 27b) which slides along the first sliding bearing 28, shifting the direction of eccentricity and therefore shifting the engagement point of the toothed wheel 16 in the toothed ring 17. The shifting of the engagement point of the toothed wheel 16 in the toothed ring 17 manifests itself as a wobbling rolling movement of the fitting parts 11 and 12 on each other.

Because of the weight of the backrest 4, which is customarily situated obliquely, and a pressure exerted on the backrest 4 by the occupant, a differentiation can be made in the case of the wedge segments 27a and 27b between a first wedge segment 27a, which is subjected to a higher load and is in front during an upward movement of the backrest 4, and a second wedge segment 27b, which is subjected to a lower load. The efficiency of the fitting 10 depends noticeably on the friction between the first wedge segment 27a and the collar extension 19. According to the invention, in order to reduce this friction, a second sliding bearing 41 is provided which sits in a more or less (e.g., substantially) immovable manner on the first wedge segment 27a and slides with little friction on the collar extension 19, i.e. the second sliding bearing 41 corresponds functionally to the first sliding bearing 28.

In the first exemplary embodiment, the second sliding bearing 41 is designed as a ring segment which extends over somewhat less than the inner side of the first wedge segment 27a. In the second exemplary embodiment, the second sliding bearing 41 is designed as a ring which is more or less (e.g., substantially) completely closed and on which the wedge segment 27 which is subjected to a lower load also sits. Since the two exemplary embodiments otherwise correspond, except for geometrical adaptations to the shape of the second sliding bearing 41, components which are identical and act in an identical manner bear the same reference numbers. In a modification to both exemplary embodiments, the second sliding bearing 41 is positioned on the inner side of the collar extension 19 in a region free from the hub 22, and the first wedge segment 27a, which is subjected to a greater load, is mounted to the second sliding bearing by way of an extension arm.

The friction between the first wedge segment 27a and the collar extension 19 not only has an effect on the efficiency but also on the self-locking of the gear of the fitting 10. So that at least one of the two fittings 10 of the vehicle seat 1 remains self-locking in spite of the first wedge segment 27a being mounted in a sliding manner on two sides, according to the invention, in the case of this fitting 10, a brake which is effective in the inoperative state of the fitting 10 is provided, in the present case a wrap spring brake 44. The wrap spring brake 44 is arranged in a wrap spring bushing 46 and, on account of its prestress, the wrap spring brake 44 bears frictionally against the inner wall of the wrap spring bushing 46. The wrap spring bushing 46, is produced, for example, from plastic. The wrap spring bushing 46 is arranged in a rotationally fixed manner on the second fitting part 12 by three groups of three radially (and/or axially) protruding wrap spring bushing arms 48 which are offset with respect to one another by 120°. The wrap spring bushing arms 48 engage with a positive fit in the inner toothing produced on the rear side of the toothed wheel 16 by the embossing operation.

For actuation, the wrap spring brake 44 has a radially inwardly protruding wrap spring arm 50 at each of its ends. The first wedge segment 27a is provided with an axially protruding brake cam 51 which is arranged between the two wrap spring arms 50 with play in the circumferential direction, i.e. in the region between the two wrap spring arms 50. When the brake cam 51 bears against a wrap spring arm 50, the brake cam 51 acts on the wrap spring brake 44 in a closing manner, i.e. brakes the wrap spring brake 44 and prevents rotation of the components defining the eccentric relative to the second fitting part 12. With blockage of the eccentric, the first fitting part 11 is also fixed relative to the second fitting part 12.

In order to cancel the braking action of the wrap spring brake 44 during driving of the driver 21, first, at the end of the driver segment 25 which is assigned to the first wedge segment 27a, a first driver cam 53 is provided on the driver 21; and, second, a second driver cam 55 is provided in the region which is arranged at approximately identical radial spacing between the ends of the driver segment 25. The first and second driver cams 53, 55 both protruding axially. The wrap spring arms 50 together with the brake cam 51 are arranged with play between the two driver cams 53 and 55, i.e. the driver cams 53 and 55 are arranged in the circumferential direction outside the wrap spring arms 50. When the driver 21 is rotated, first of all one of the driver cams 53 or 55 comes to bear against a wrap spring arm 50, which acts on the wrap spring brake 44 in an opening manner and cancels the braking action. As the movement continues, the eccentric drives the above-described rolling movement of the fitting parts 11 and 12 on each other.

It will be understood by those skilled in the art that while the present invention has been discussed above with reference to exemplary embodiments, various additions, modifications and changes can be made thereto without departing from the spirit and scope of the invention as set forth in the following claims.

That which is claimed:

1. A fitting for a vehicle seat, the fitting comprising:
    a first fitting part and a second fitting part, wherein there is geared connection between the first fitting part and the second fitting part so that there can be relative rolling between the first fitting part and the second fitting part;
    wedge segments that at least partially define an eccentric, wherein the wedge segments are rotatably mounted on both the first fitting part and the second fitting part, whereby the eccentric is rotatably mounted on both the first fitting part and the second fitting part, and wherein the eccentric is for being driven, and the eccentric is for causing the relative rolling between the first fitting part and the second fitting part in response to the eccentric being driven;
    a driver for driving the eccentric so that the eccentric causes the relative rolling between the first fitting part and the second fitting part;
    a first bearing for reducing friction, wherein the wedge segments are rotatably mounted on the second fitting part by way of the first bearing, and the first bearing is a sliding bearing or a rolling bearing; and
    a second bearing for reducing friction, wherein at least a first of the wedge segments is rotatably mounted on the first fitting part by way of the second bearing, and the second bearing is a sliding bearing or a rolling bearing.

2. The fitting according to claim 1, wherein a second of the wedge segments is subjected to a lower load than the first wedge segment while the eccentric is driven by the driver.

3. The fitting according to claim 2, wherein the second wedge segment is rotatably mounted on the first fitting part by way of the second bearing.

4. The fitting according to claim 2, further comprising a brake for holding at least the first wedge segment during an inoperative state of the fitting, so that the brake is for restricting relative rolling between the first fitting part and the second fitting part during the inoperative state of the fitting, and the first wedge segment is released while the eccentric is driven by the driver.

5. The fitting according to claim 1, wherein the second wedge segment is rotatably mounted on the first fitting part by way of the second bearing.

6. The fitting according to claim 5, further comprising a brake for holding the first wedge segment during an inoperative state of the fitting, so that the brake is for restricting relative rolling between the first fitting part and the second fitting part during the inoperative state of the fitting, and the first wedge segment is released while the eccentric is driven by the driver.

7. The fitting according to claim 1, further comprising a brake for holding at least the first wedge segment during an inoperative state of the fitting, so that the brake is for restricting relative rolling between the first fitting part and the second fitting part during the inoperative state of the fitting, and the first wedge segment is released while the eccentric is driven by the driver.

8. The fitting according to claim 7, wherein the brake is a wrap spring brake.

9. The fitting according to claim 8, comprising a bushing that is rotationally fixed with respect to the second fitting part, wherein the wrap spring brake bears against the bushing.

10. The fitting according to claim 9, wherein the bushing has a plurality of radially protruding bushing arms which engage with a positive fit in an inner toothing of the second fitting part.

11. The fitting according to claims 10, wherein:
the first wedge segment has a brake cam for bearing against an arm of the wrap spring brake, and
the brake cam acts on the wrap spring brake in a closing manner in response to the brake cam bearing against the arm of the wrap spring brake.

12. The fitting according to claim 10, wherein:
the driver has at least one driver cam for bearing against an arm of the wrap spring brake, and
the driver cam acts on the wrap spring brake in an opening manner in response to the driver cam bearing against an arm of the wrap spring brake.

13. The fitting according to claims 9, wherein:
the first wedge segment has a brake cam for bearing against an arm of the wrap spring brake, and
the brake cam acts on the wrap spring brake in a closing manner in response to the brake cam bearing against the arm of the wrap spring brake.

14. The fitting according to claim 9, wherein:
the driver has at least one driver cam for bearing against an arm of the wrap spring brake, and
the driver cam acts on the wrap spring brake in an opening manner in response to the driver cam bearing against an arm of the wrap spring brake.

15. The fitting according to claim 8, wherein:
the driver has at least one driver cam for bearing against an arm of the wrap spring brake, and
the driver cam acts on the wrap spring brake in an opening manner in response to the driver cam bearing against an arm of the wrap spring brake.

16. The fitting according to claim 8, wherein the wrap spring brake includes two wrap spring arms.

17. The fitting according to claim 1, further comprising a wrap spring brake wherein:
at least one of the wedge segments has a brake cam for bearing against an arm of the wrap spring brake, and
the brake cam acts on the wrap spring brake in a closing manner in response to the brake cam bearing against the arm of the wrap spring brake, so that the wrap spring brake holds at least one of the wedge segments and restricts relative rolling between the first fitting part and the second fitting part during an inoperative state of the fitting.

18. The fitting according to claim 17, wherein:
the driver has at least one driver cam for bearing against the arm of the wrap spring brake, and
the driver cam acts on the wrap spring brake in an opening manner in response to the driver cam bearing against an arm of the wrap spring brake.

19. The fitting according to claim 1 in combination with the vehicle seat, wherein:
the vehicle seat includes a seat part and a backrest;
the backrest is attached to the seat part by at least the fitting;
the fitting is located at a side of the vehicle seat; and
the fitting is for at least partially adjusting inclination of the backrest relative to the seat part.

20. The fitting according to claim 1, further comprising a third bearing for reducing friction, wherein a second of the wedge segments is rotatably mounted on the first fitting part by way of the third bearing, and the third bearing is a sliding bearing or a rolling bearing.

* * * * *